United States Patent [19]

Peschka et al.

[11] Patent Number: 5,746,172

[45] Date of Patent: May 5, 1998

[54] PROCESS FOR INCREASING THE TORQUE OF AN INTERNAL COMBUSTION ENGINE AND INTERNAL COMBUSTION ENGINE

[75] Inventors: Walter Peschka, Sindelifingen; Gottfried Schneider, Stuttgart, both of Germany

[73] Assignee: Deutsche Forschungsanstalt Fuer Luft-und Raumfahrt E.V., Bonn, Germany

[21] Appl. No.: 589,564

[22] Filed: Dec. 18, 1995

Related U.S. Application Data

[63] Continuation of PCT/EP95/01316, Apr. 11, 1995.

[30] Foreign Application Priority Data

Apr. 19, 1994 [DE] Germany .......................... 44 13 583.1

[51] Int. Cl.$^6$ .................................................. F02B 19/02
[52] U.S. Cl. .................. 123/292; 123/184.54; 123/559.1
[58] Field of Search .................................. 123/559.1, 39, 123/292, 253, 286, 184.54

[56] References Cited

U.S. PATENT DOCUMENTS 2,543,758  3/1951  Bodine .
4,365,471  12/1982  Adams .

FOREIGN PATENT DOCUMENTS 0 139 987  5/1985  European Pat. Off. .
2 026 091  1/1980  United Kingdom .

OTHER PUBLICATIONS

VDI–Forschungsberichte, No. 150, VDI–Verlag 1991, pp. 143–168.
VDI–Forschungsberichte, No. 167, VDI–Verlag 1992, pp. 83–114.

*Primary Examiner*—Erick R. Solis
*Attorney, Agent, or Firm*—Barry R. Lipsitz

[57] ABSTRACT

In order to improve a process for increasing the torque of an internal combustion engine burning a fuel by means of an oxidizing agent and comprising at least one cylinder and an induction system, in which the mass flow of the gaseous oxidizing agent into the cylinder or cylinders is increased, as well as an internal combustion engine such that the torque of the internal combustion engine is increased at any rotational speed to a greater extent than with known passive pressure-charging processes, it is suggested to make a charging mixture consisting of a charging fuel and the oxidizing agent available in the induction system and to ignite this cyclically in the induction system at such points of time that due to the expansion during the rapid combustion of the charging mixture an increase in pressure occurs at the intake port of at least one cylinder during its intake phase.

44 Claims, 3 Drawing Sheets

PROCESS FOR INCREASING THE TORQUE OF AN INTERNAL COMBUSTION ENGINE AND INTERNAL COMBUSTION ENGINE

This application is a continuation of International PCT Application No. PCT/EP95/01316, filed on Apr. 11, 1995.

The present invention relates to a process for increasing the torque of an internal combustion engine burning a fuel by means of a gaseous oxidizing agent and comprising at least one cylinder and an induction system, in which the mass flow of the gaseous oxidizing agent into the cylinder or cylinders is increased.

In addition, the invention relates to an internal combustion engine comprising at least one cylinder which has a combustion chamber for the combustion of a fuel by means of a gaseous oxidizing agent, and also comprising an induction system.

So-called passive pressure-charging processes are known, in which vibrations are generated in the induction system due to the periodically opening intake cross sections of the cylinders of the internal combustion engine and these vibrations can, when suitably coordinated, effect a boost in the flows of air masses into the individual cylinders. In this respect, a distinction is made between the processes of the vibration pipe pressure-charging and the resonance pressure-charging.

For using the process of the vibration pipe pressure-charging, the induction pipes of the individual cylinders, through which the air flows into the combustion chamber of the respective cylinder during the induction cycle, either open freely into the atmosphere or they are combined at a common receiving means. During the induction procedure, a low-pressure wave migrates from the intake port of the cylinder into the induction pipe as a result of the inertia effect of the gas column. This low-pressure wave is reflected at the open pipe end as a pressure wave. In order to boost the flow of air masses into the cylinder, the length of the pipe must be adjusted such that the pressure wave arrives at the cylinder a little time prior to closure of the intake valve.

Such adjusted induction pipes are designated as vibration pipes. During the vibration pipe pressure-charging, the pressure wave of the charge is excited by the preceding induction stroke. A repeated surging back and forth is insignificant for the charging procedure, the mutual influencing of the vibration pipes is slight.

For using the process of the resonance pressure-charging, several cylinders are connected via short induction pipes to resonance chambers which, for their part, communicate with the atmosphere or rather a receiving means. The air mass in the resonance chamber and in the induction pipes forms a vibratory system, in which resonant vibrations are excited due to the periodically opening intake cross sections of the cylinders. When coordinated suitably, these resonant vibrations lead to the increase in the pressure at the intake ports of the cylinders during their intake phases.

With the passive pressure-charging processes, however, only intermittent pressure increases of at the most 0.5 bar can be achieved. The increase in the flows of air masses into the individual cylinders which can be achieved and, with it, the increase in the torque is therefore correspondingly slight.

The object of the present invention was therefore to specify a pressure-charging process, with which greater intermittent increases in pressure and, consequently, a greater increase in the torque can be achieved.

This object is accomplished in accordance with the invention in that in a process of the type described at the outset a charging mixture consisting of a charging fuel and the oxidizing agent is made available in the induction system and cyclically ignited in the induction system at such points of time that due to the expansion during the rapid combustion of the charging mixture an increase in pressure occurs at the intake port of at least one cylinder during its intake phase.

This inventive concept of an active pressure-charging process offers considerable advantages over the known passive pressure-charging processes. The torque of the internal combustion engine can be raised to a considerably greater extent since greater intermittent increases in pressure occur at the intake ports of the cylinders when the charging mixture is suitably metered. Moreover, the strength of the pressure-charging is not caused solely by the construction but can be adapted to requirements during operation. Furthermore, the reaction products of the combustion of the charging mixture which reach the combustion chambers of the cylinders contribute to suppressing any uncontrolled early ignition.

It is particularly advantageous when the ignition point of the charging mixture is controlled as a function of the load state of the internal combustion engine. An optimum increase in the torque can thereby be achieved over the entire rotational speed range of the internal combustion engine.

It is advantageous, in particular, in the case of internal combustion engines having a plurality of cylinders when the ignition of the charging mixture takes place at several locations of the induction system. The distances travelled by pressure waves from the place of combustion of a charging mixture as far as the cylinder intake ports, at which an increase in pressure is intended to be caused, can thus be reduced, which reduces the inertia of the pressure-charging process. Moreover, when there are several ignition locations it is easier to adjust the increases in pressure occurring at the intake ports of different cylinders to one another.

If the charging mixture is ignited at several locations of the induction system, it is more favorable, depending on the geometry of the induction system and the arrangement of the ignition locations, for the ignition of the charging mixture to take place at the various locations simultaneously or consecutively.

To achieve a uniform pressure-charging of all the cylinders, it is particularly advantageous when the charging mixture is ignited at the various locations of the induction system as a function of the cylinder firing order.

The increase in pressure which can be achieved at the intake port of a cylinder with a given consumption of charging fuel can be increased when the process of the active pressure-charging described thus far is combined with the process of the vibration pipe pressure-charging. The ignition points of the charging mixture, the intake phase of the cylinder and the length of the induction pipe (vibration pipe) are coordinated with one another such that the pressure wave resulting due to the combustion of the charging mixture arrives at the intake port of the cylinder together with the pressure wave originating from the opening of the intake valve and reflected at the end of the induction pipe.

An alternative possibility for increasing the effectiveness of the inventive process is to combine the active pressure-charging process with the process of the resonance pressure-charging.

In this respect, resonant pressure vibrations are excited due to the burning off of the charging mixture in the induction system and these vibrations result in the occurrence of an increase in pressure at the intake port of at least one cylinder during its intake phase.

In order to utilize the effect of the additional resonance pressure-charging as well as possible, it is of advantage to subdivide the induction system as a function of the load state of the internal combustion engine, preferably by one or more throttle valves. It is then possible to excite resonant vibrations even at high rotational speeds by dividing the vibratory system into several, small vibratory systems having higher inherent frequencies.

It is advantageous to control the ignition point or ignition points of the charging mixture as a function of the position of the throttle valve or throttle valves. In this way, the desired intermittent increases in pressure at the intake ports of the cylinders can be achieved even with a geometry of the induction system which is altered by the throttle valves.

It is of advantage when the charging mixture is produced at the location of the ignition. This avoids any transport of the charging mixture from its place of origin to the location of the ignition which would entail a risk due to possible early ignition and would increase the inertia of the pressure-charging process with respect to varying operating conditions due to the required transport time.

The charging mixture is advantageously produced by injection of the charging fuel into the oxidizing agent. In this way, the charging mixture can be metered very exactly.

It is particularly advantageous when the charging fuel is injected in the form of several consecutive pulses such that the concentration stratification of the charging fuel resulting in the charging mixture is such that the charging fuel is enriched in the region of the place of ignition. The minimum amount of charging fuel required to reach the ignition limit is thereby reduced.

It is favorable when the charging mixture has an excess of the oxidizing agent, preferably an equivalence ratio of 0.1 to approximately 0.2. Such a lean charging mixture burns off very quickly and results in a high increase in pressure in the induction system at only a slight increase in temperature.

In addition, it is advantageous when the charging fuel corresponds to the fuel of the internal combustion engine. This precludes the necessity of additional storage and filling devices for the charging fuel.

Hydrogen is advantageously used as charging fuel since hydrogen has particularly low ignition limits, i.e. can be used in very lean charging mixtures, and burns off very quickly which promotes the build-up of a pressure wave during the combustion.

The combustion of the charging fuel takes place particularly quickly in pure oxygen, which promotes the formation of a pressure wave. It is therefore favorable to use pure oxygen as oxidizing agent.

Alternatively, air is advantageously used as oxidizing agent. Air is available at no cost and need not be taken along in a special storage means.

It is particularly favorable to use, on the one hand, hydrogen as charging fuel and, on the other hand, hydrogen or a mixture consisting of hydrogen and an additional reducing agent as fuel. In this case, the filling, storage and pumping devices present in any case for the fuel can be used at least partially for the charging fuel, as well.

In addition, it is of advantage when the induction system is separated from the supply of oxidizing agent during the burning off of the charging fuel. Due to this measure, the equalization of pressure between the induction system and the supply of oxidizing agent is prevented and the formation of pressure waves in the induction system is promoted.

The separation of the induction system from the supply of oxidizing agent by one or more rotary slide valves has the advantage that the intake phases of these valves can be synchronized in a simple manner with the intake phases of the intake valves of the cylinders.

The separation of the induction system from the supply of oxidizing agent by one or more passive check valves which allow the oxidizing agent to flow only from the supply of oxidizing agent into the induction system has the advantage that these passive check valves need not be controlled separately.

The separation of the induction system from the supply of oxidizing agent by one or more active check valves (e.g. solenoid valves) is particularly favorable since additional degrees of freedom, namely the duration of the intake phase and the relative temporal position of the intake phases in relation to the intake phases of the intake valves of the cylinders, can be altered during operation with respect to an optimization of the flow of the torque when active check valves are used.

It is advantageous to cool the gas mixture contained in the induction system with the aid of a heat exchanger. This measure prevents the temperature of the oxidizing agent flowing into the cylinders from rising to too great an extent as a result of the combustion of the charging fuel, which would result in a deterioration in the efficiency of the internal combustion engine.

In order to prevent the enrichment of reaction products of the combustion of the charging mixture in the induction system, it is of advantage when the induction system is flushed with the oxidizing agent.

It is particularly favorable when the induction system is flushed by means of a preconnected charge blower and suitable slide or valve arrangements. This prevents reaction products of the combustion of the charging mixture from escaping via the supply of oxidizing agent.

Supplementary to the invention described thus far, the inventive object is also accomplished by an internal combustion engine comprising at least one cylinder which has a combustion chamber for the combustion of a fuel by means of a gaseous oxidizing agent and also comprising an induction system, the internal combustion engine being characterized in that the induction system has an injector for a charging fuel and an ignition device. In this respect, the injector serves to generate a mixture consisting of the charging fuel and the oxidizing agent and the ignition device the ignition of the charging mixture at such points of time that due to the expansion during the rapid combustion of the charging mixture an increase in pressure occurs at the intake port of at least one cylinder during its intake phase.

The internal combustion engine advantageously has, in addition, either induction pipes designed as vibration pipes for the additional vibration pipe pressure-charging or a resonance pipe for the additional resonance pressure-charging.

It is particularly advantageous when the induction system has at least one special charging chamber, in which at least one injector for the charging fuel and at least one ignition device are respectively arranged.

The formation of pressure waves which propagate in the direction towards the intake ports of the cylinders or the excitation of resonant pressure vibrations in the gas mixture located in the induction system as a result of the expansion during the rapid combustion of the charging mixture can be promoted by a suitable (e.g. funnel-shaped configuration of the charging chamber).

If the induction system has both a resonance pipe and at least one charging chamber, it proves to be favorable for the excitation of resonant vibrations in the resonance pipe when the volume of a charging chamber is small in relation to the volume of the resonance pipe, preferably the volume of a charging chamber is 5 to 10% of the volume of the resonance pipe.

Additional, advantageous developments of the invention are the subject matter of subclaims 27, 28, 32 and 35 to 44, the advantages of which have already been explained in the above.

Additional features and advantages of the invention are the subject matter of the following description as well as of the drawings of three embodiments.

Figure 1:
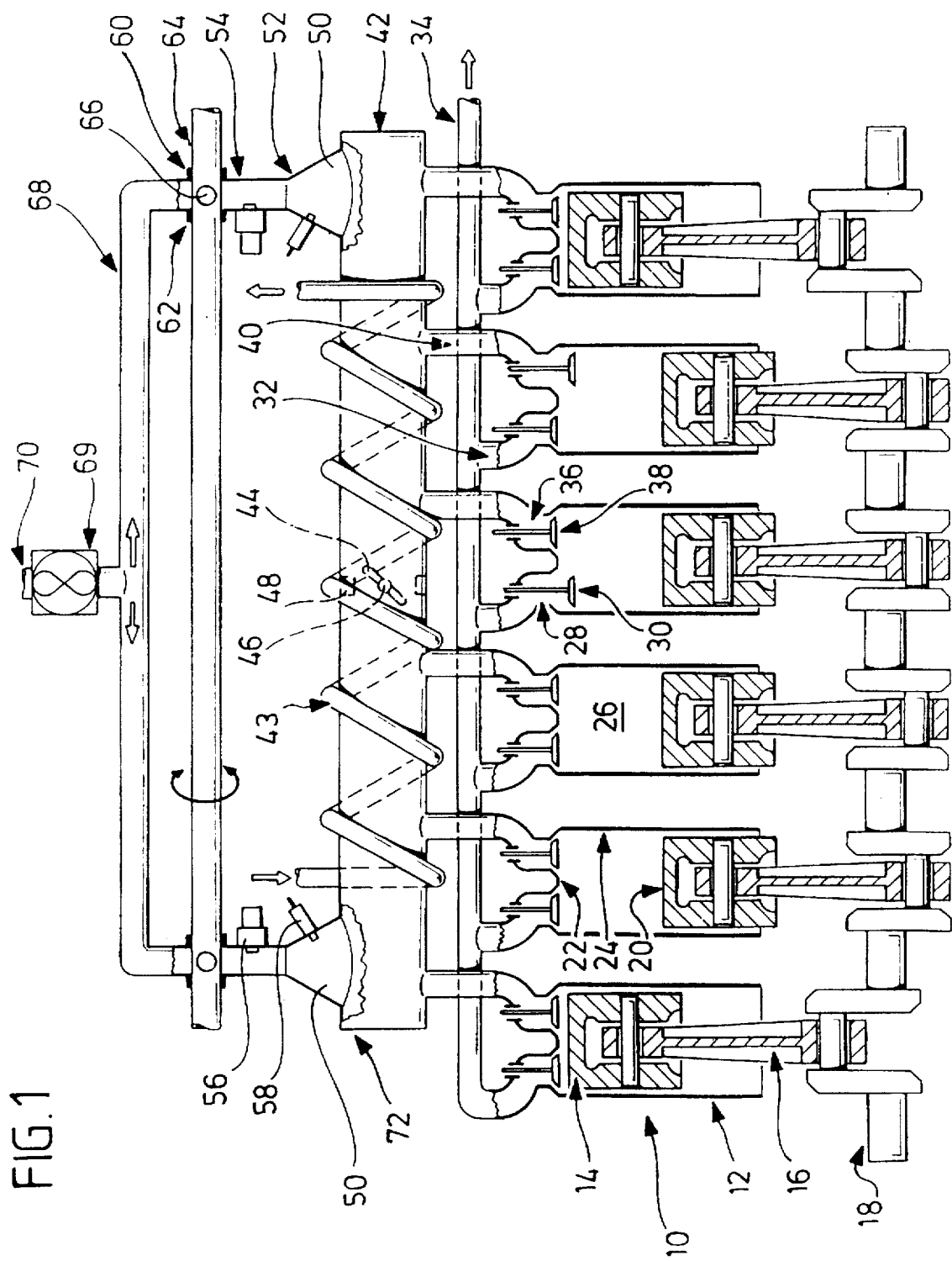
FIG. 1 is a schematic, partially cutaway illustration of an inventive internal combustion engine with additional resonance pressure-charging and additional charge blower.

The embodiment of an internal combustion engine 10 shown in FIG. 1 has six cylinders 12. Each of the cylinders 12 contains a reciprocating piston 14. The pistons 14 are connected in a customary manner with a common crankshaft 18 via a respective connecting rod 16.

The end face 20 of each piston 14 facing away from the crankshaft 18, together with the inner end face 22 of the associated cylinder 12 located opposite the end face 20 of the piston 14 and the inner wall 24 of the cylinder casing located between these, surrounds a cylindrical combustion chamber 26.

The inner end face 22 of each cylinder 12 has an outlet port 28 which can be opened or closed by an outlet valve 30. An outlet pipe 32 connects the outlet port 28 of each cylinder 12 with a common exhaust discharge line 34 which leads to an exhaust system (not illustrated).

Furthermore, the inner end face 22 of each cylinder 12 has an intake port 36 which can be opened or closed by an intake valve 38. The intake port 36 of each cylinder 12 is connected to a common resonance pipe 42 via an induction pipe 40. The induction pipes 40 are arranged parallel to one another and open into the resonance pipe 42 transversely to its longitudinal axis.

The resonance pipe 42 is closed at both ends. A helical cooling coil 43 is arranged on the casing of the resonance pipe 42. This cooling coil has cooling agent flowing through it and is connected to the resonance pipe 42 in a heat-conducting manner.

The resonance pipe 42 has a circular throttle valve 44. The throttle valve 44 is pivotable about an axis 46 which is arranged at right angles to the longitudinal axis of the resonance pipe 42 and is mounted in the casing of the resonance pipe 42.

In its closed position, the throttle valve 28 blocks, together with an annular stop 48 which protrudes from the casing of the resonance pipe 42 into its interior, the entire cross section of the resonance pipe 42 and thereby divides the resonance pipe 42 in axial direction into two equally large halves.

A charging chamber 50 on the side of the casing of the resonance pipe 42 located opposite the induction pipes 40 opens into each of these halves of the resonance pipe 42. Each charging chamber 50 is of a funnel-shaped design and has a frustum-shaped funnel head 52 and a cylindrical funnel neck 54. The funnel head 52 is open towards the resonance pipe 42 and the common axis of symmetry of funnel head 52 and funnel neck 54 extends at right angles to the longitudinal axis of the resonance pipe 42.

Each charging chamber 50 has a hydrogen injector 56 which is arranged in the wall of the funnel neck 54 and a spark plug 58 which is arranged in the wall of the funnel head 52.

The induction pipes 40, the resonance pipe 42 and the charging chambers 50 form an induction system designated as a whole as 72.

A rotary slide valve 60 is arranged at the end of the funnel neck 54 of each charging chamber 50 facing away from the resonance pipe 42. Each of the rotary slide valves 60 has a hollow-cylindrical valve housing 62, the axis of which is at right angles to the axis of symmetry of the funnel neck 54.

A common, cylindrical rotary slide 64 is mounted in both valve housings 62 so as to be gas-tight and rotatable. The rotary slide 64 forms the valve body of the two rotary slide valves 60 and each has a radial, through rotary slide opening 66 in the region of the rotary slide valves 60. The two rotary slide openings 66 can be aligned parallel or askew in relation to one another, depending on the desired firing order of the charging mixtures.

In the open position of each rotary slide valve 60, the rotary slide opening 66 connects the outlet opening of the funnel neck 54 with an oppositely located outlet opening of a charge air supply line 68. The two charge air supply lines 68 are joined at the discharge opening of a charge blower 69, an air inlet 70 being arranged at its intake opening.

During the operation of the internal combustion engine 10, the rotary slide valves 60 are periodically opened and closed due to the rotation of the rotary slide 64 about its longitudinal axis, the axes of the rotary slide openings 66 thereby forming varying angles with the axes of symmetry of the funnel necks 54.

During the opening phase of a rotary slide valve 60, air flows from the air inlet 70 through the charge blower 69 and the charge air supply line 68 into the associated charging chamber 50. With the aid of the hydrogen injector 56, hydrogen is injected into this air and thus a very lean hydrogen-air mixture (charging mixture) having an equivalence ratio of approximately 0.1 to 0.2 is made available in the charging chamber 50.

During the closing phase of the rotary slide valve 60, the charging mixture is ignited in the charging chambers 50 with the aid of the spark plugs 58 and burns off.

Due to the increase in pressure during this combustion, vibrations which lead to pressure maxima at the intake ports 36 of the cylinders 12 are excited in the vibratory system formed by the air in the charging chambers 50, the resonance pipe 42 and the induction pipes 40. By suitably selecting the points of time, at which the charging mixtures are ignited in the charging chambers 50, it is possible for a pressure maximum to occur at the intake port 36 of a cylinder 12 just when the intake port 36 is opened by the associated intake valve 38.

This means that the flow of air into the relevant cylinder 12 is increased quite considerably during its intake phase.

Moreover, the water vapor resulting during the combustion of the lean hydrogen-air mixture contributes to suppressing any uncontrolled early ignition in the combustion chamber 26 of the cylinder 12.

The gas mixture located in the resonance pipe 42 is cooled by means of the cooling coil 43. This means that the oxidizing agent flowing into the cylinder 12 will be prevented from heating up to too great an extent as a result of the combustion of the charging mixture, which would impair the efficiency of the internal combustion engine 10.

The optimum ignition points for the ignition of the lean hydrogen-air mixture in the charging chambers 50 depend on the geometry of the induction system 72 and on the rotational speed of the internal combustion engine 10.

The ignition can take place in the various charging chambers 50 simultaneously or consecutively.

The optimum ignition points can be determined either theoretically on the basis of an analysis of the vibration behavior of the air in the system consisting of the charging chambers 50, the resonance pipe 42 and the induction pipes 40 or experimentally.

In the case of high rotational speeds of the engine, the vibratory system is subdivided by closure of the throttle valve 44 which results in higher inherent frequencies and, therefore, a vibration behavior of the vibratory system which is suitable for higher rotational speeds.

When the rotary slide 64 synchronized with the cylinder valve control opens the rotary slide valves 60 again, the oxygen-containing exhaust gas from the charge combustions is flushed out of the charging chambers 50 into the resonance pipe 42 by the air flowing from the air inlet 70 through the charge blower 69 and the charge air supply lines 68 into the charging chambers 50, and the charging cycle begins anew with the injection of hydrogen by means of the hydrogen injectors 56.

Figure 2:
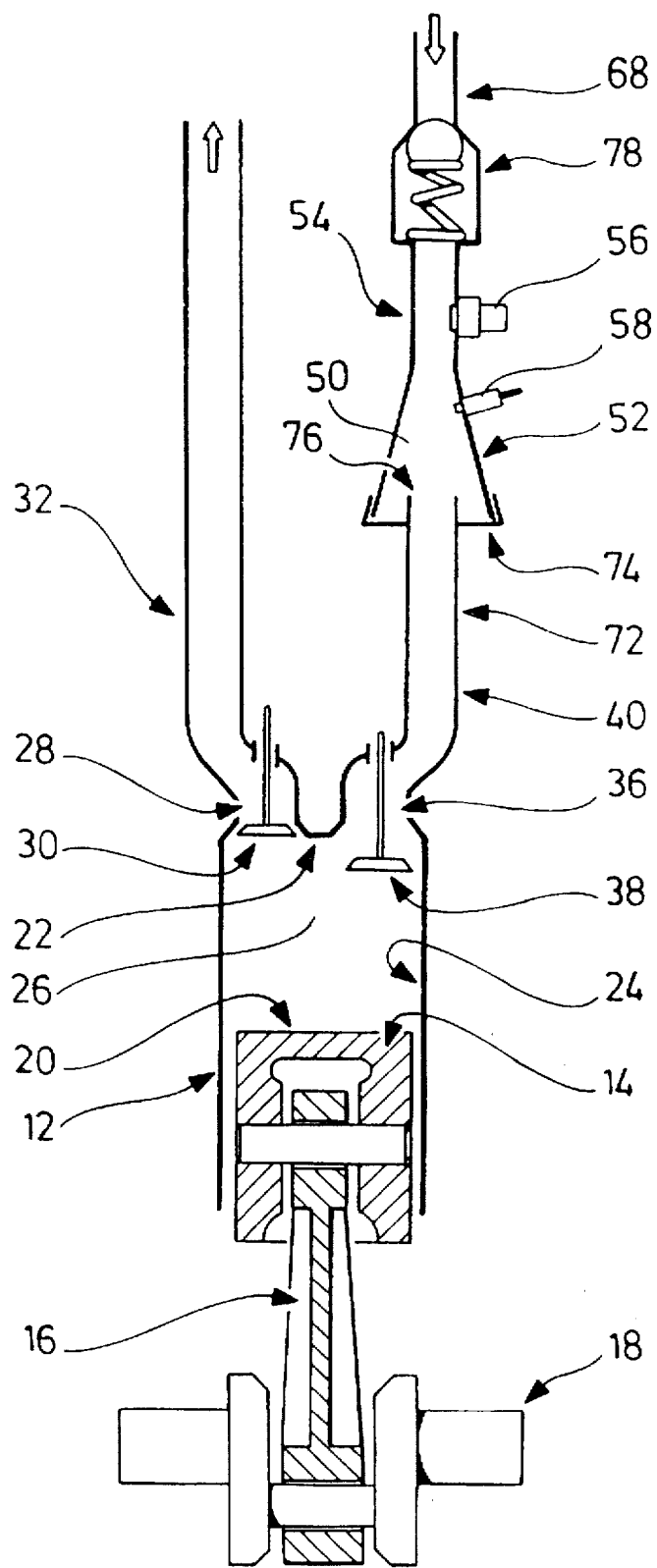
FIG. 2 is a section from a schematic, cutaway illustration of an inventive internal combustion engine with additional vibration pipe pressure-charging.

The arrangement belonging to one of the cylinders 12 of a second embodiment of an inventive internal combustion engine is illustrated in FIG. 2. The arrangement belonging to the remaining cylinders 12 is identical to the illustrated arrangement. Corresponding elements are designated in FIGS. 1 and 2 with the same reference numerals.

The second embodiment illustrated in FIG. 2 differs from the first embodiment illustrated in FIG. 1 in that the resonance pipe 42 is missing and each cylinder 12 is provided with its own charging chamber 50.

Moreover, each of the rotary slide valves 60 from FIG. 1 has been replaced by a passive nonreturn valve 78. In principle, the embodiment of FIG. 2 can, however, also be provided with rotary slide valves 60 instead of passive nonreturn valves 78 and the embodiment of FIG. 1 with passive nonreturn valves 78 instead of rotary slide valves 60.

In this embodiment, each induction pipe 40 opens directly into a charging chamber 50 associated with it. The charging chamber 50 is funnel-shaped and comprises a frustum-shaped funnel head 52 and a cylindrical funnel neck 54. A hydrogen injector 56 is arranged in the wall of the funnel neck 54 and a spark plug 58 in the wall of the funnel head 52.

A rotary slide valve 60 is located at the end of the funnel neck 54 facing away from the funnel head 52.

The end of the funnel head 52 facing away from the funnel neck 54 is closed in a gas-tight manner by a funnel cap 74. The induction pipe 40 is guided in a gas-tight manner through an opening in the funnel cap 74 and protrudes with its open end 76 into the interior of the charging chamber 50.

During the operation of the internal combustion engine, each of the nonreturn valves 78 is opened when the pressure in the charging chamber 50 is lower than the pressure in the charge air supply line 68.

During the opening phase of a nonreturn valve 78, air flows through the air supply line 68 into the associated charging chamber 50. With the aid of the hydrogen injector 56, hydrogen is injected into this air and thus a very lean hydrogen-air mixture having an equivalence ratio of approximately 0.1 to 0.2 is made available in the charging chamber 50.

During the closing phase of the nonreturn valve 78, the hydrogen-air mixture in the charging chamber 50 is ignited with the aid of the spark plug 58 and burns off. Due to the combustion, a pressure wave results which propagates in the direction towards the induction pipe 40.

The point of time, at which the hydrogen-air mixture in one of the charging chambers 50 is ignited, is selected such that the resulting pressure wave reaches the open end 76 of the associated induction pipe 40 just when a low-pressure wave, which resulted beforehand during the opening of the intake valve 38 of the associated cylinder 12 and has migrated into the induction pipe 40, is reflected at the open end 76 of the induction pipe 40 as a pressure wave. Then, the reflected pressure wave and the pressure wave generated by the combustion run together through the induction pipe 40 and the intake port 36 into the combustion chamber 26 of the cylinder 12 and thereby increase the flow of air into the relevant cylinder 12 quite considerably during its intake phase. For this purpose, the induction pipe 40 must be designed as a vibration pipe, i.e. its length must be dimensioned such that the pressure waves arrive at the intake port 36 prior to closure of the intake valve 38.

The water vapor resulting during the combustion of the lean hydrogen-air mixture contributes to suppressing any uncontrolled early ignition in the combustion chamber 26 of the cylinder 12.

In this embodiment, the hydrogen-air mixtures in the various charging chambers 50 must be ignited one after the other in accordance with the cylinder firing order.

Figure 3:
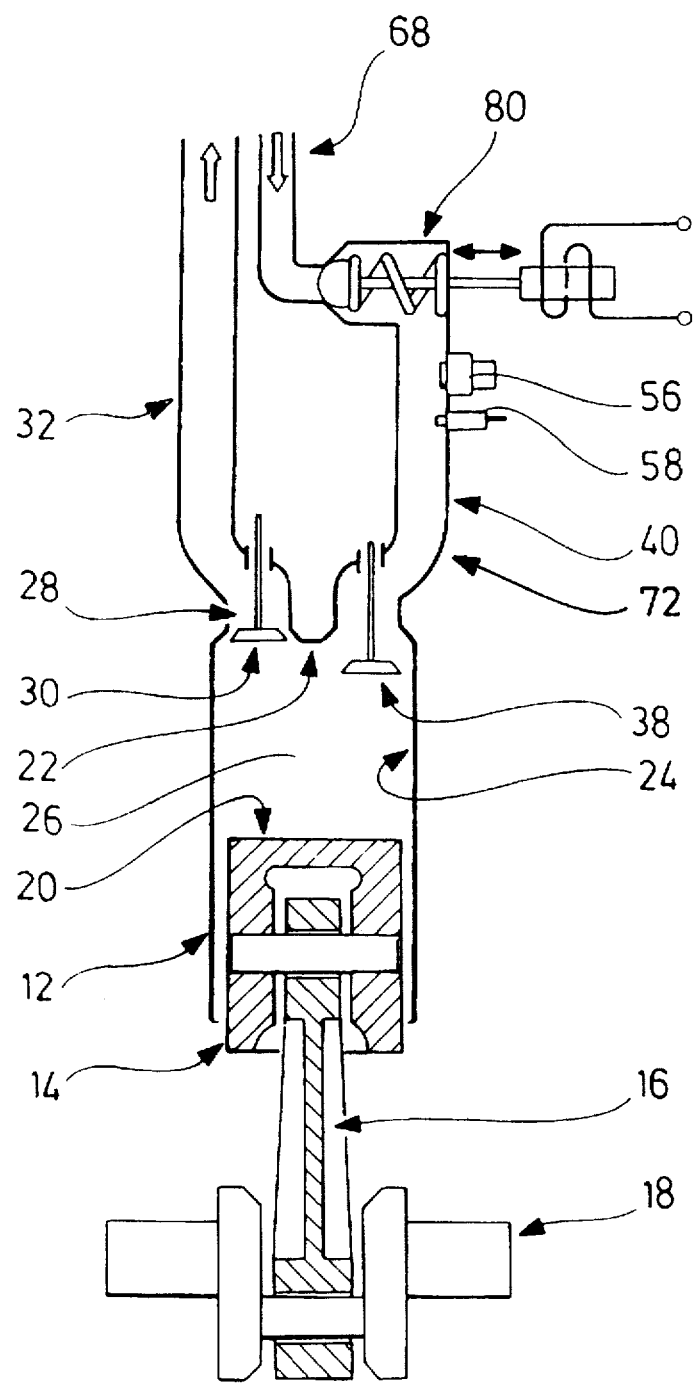
FIG. 3 is a section from a schematic, cutaway illustration of an inventive internal combustion engine without additional passive pressure-charging.

In a third embodiment of an inventive internal combustion engine, the arrangement shown in FIG. 3 belongs to each cylinder 12. Corresponding elements are designated with the same reference numerals in FIGS. 1, 2 and 3.

The third embodiment illustrated in FIG. 3 differs from the second embodiment illustrated in FIG. 2 in that the charging chambers 50 are missing and the induction pipes 40 are connected directly to the associated rotary slide valves 60. A hydrogen injector 56 and a spark plug 58 are arranged in the wall of each induction pipe 40, near to the end of the induction pipe 40 on the side of the rotary slide valve.

Moreover, each of the nonreturn valves 78 from FIG. 2 has been replaced by a solenoid valve 80. In principle, the embodiment of FIG. 3 can, however, also be provided with nonreturn valves 78 or rotary slide valves 60 instead of solenoid valves 80, the embodiment of FIG. 2 with solenoid valves 80 instead of nonreturn valves 78 and the embodiment of FIG. 1 with solenoid valves 80 instead of rotary slide valves 60.

During the operation of the internal combustion engine, each of the solenoid valves 80 is cyclically opened and closed.

During the opening phase of a solenoid valve 80, air flows through the charge air supply line 68 into the corresponding induction pipe 40. With the aid of the hydrogen injector 56, hydrogen is injected into this air and so a very lean hydrogen-air mixture having an equivalence ratio of approximately 0.1 to 0.2 is made available near to the end of the induction pipe 40 on the side of the rotary slide valve.

During the closing phase of the solenoid valve 80, the hydrogen-air mixture in the induction pipe 40 is ignited with the aid of the spark plug 58 and burns off. Due to the combustion, a pressure wave is generated which propagates towards the intake port 36 of the associated cylinder 12. The point of time, at which the hydrogen-air mixture in the induction pipe 40 is ignited, is selected such that the pressure wave passes through the intake port 36 into the combustion chamber 26 of the cylinder 12 while the corresponding intake valve 38 is opened. This means that the flow of air into the relevant cylinder 12 is increased quite considerably during its intake phase.

Moreover, the water vapor resulting during the combustion of the lean hydrogen-air mixture contributes to suppressing any uncontrolled early ignition in the combustion chamber 26 of the cylinder 12.

In this embodiment, the hydrogen-air mixtures in the various induction pipes 40 must be ignited one after the other in accordance with the cylinder firing order.

We claim:

1. Process for increasing the torque of an internal combustion engine burning a fuel by means of a gaseous oxidizing agent and comprising at least one cylinder and an induction system, wherein the mass flow of the gaseous oxidizing agent into the cylinder or cylinders is increased, characterized in that a charging mixture consisting of a charging fuel and the oxidizing agent is made available in the induction system and cyclically ignited in the induction system at such points of time that due to the expansion during the rapid combustion of the charging mixture an increase in pressure occurs at the intake port of at least one cylinder during its intake phase.

2. Process as defined in claim 1, characterized in that the ignition point of the charging mixture is controlled as a function of the load state of the internal combustion engine.

3. Process as defined in claim 1, characterized in that the ignition of the charging mixture takes place at several locations of the induction system.

4. Process as defined in claim 3, characterized in that the charging mixture is ignited at several locations of the induction system as a function of the cylinder firing order.

5. Process as defined in claim 1, characterized in that the increase in pressure occurring at the intake port of the cylinder is intensified by additional use of a vibration pipe pressure-charging.

6. Process as defined in claim 1, characterized in that due to a burning off of the charging mixture in the induction system resonant pressure vibrations are excited, leading to the occurrence of the increase in pressure at the intake port of at least one cylinder during its intake phase.

7. Process as defined in claim 6, characterized in that the induction system is subdivided as a function of the load state of the internal combustion engine, preferably by one or more throttle valves.

8. Process as defined in claim 7, characterized in that the ignition point or the ignition points of the charging mixture are controlled as a function of the position of the throttle valve or the throttle valves.

9. Process as defined in claim 1, characterized in that the charging mixture is produced at the location of the ignition.

10. Process as defined in claim 1, characterized in that the charging mixture is produced by injection of the charging fuel into the oxidizing agent.

11. Process as defined in claim 10, characterized in that the charging fuel is injected in the form of several consecutive pulses such that the concentration stratification of the charging fuel resulting in the charging mixture is such that the charging fuel is enriched in the region of the ignition location.

12. Process as defined in claim 1, characterized in that the charging mixture has an excess of the oxidizing agent, preferably an equivalence ratio of 0.1 to approximately 0.2.

13. Process as defined in claim 1, characterized in that the charging fuel corresponds to the fuel of the internal combustion engine.

14. Process as defined in claim 1, characterized in that hydrogen is used as the charging fuel.

15. Process as defined in claim 1, characterized in that oxygen is used as the oxidizing agent.

16. Process as defined in claim 1, characterized in that air is used as the oxidizing agent.

17. Process as defined in claim 1, characterized in that hydrogen is used as the fuel.

18. Process as defined in claim 1, characterized in that a mixture of hydrogen and an additional reducing agent is used as the fuel.

19. Process as defined in claim 1, characterized in that the induction system is separated from the supply of oxidizing agent during a burning off of the charging fuel.

20. Process as defined in claim 19, characterized in that the induction system is separated from the supply of oxidizing agent by one or more rotary slide valves.

21. Process as defined in claim 19, characterized in that the induction system is separated from the supply of oxidizing agent by one or more passive check valves.

22. Process as defined in claim 19, characterized in that the induction system is separated from the supply of oxidizing agent by one or more active check valves.

23. Process as defined in claim 1, characterized in that the gas mixture contained in the induction system is cooled with the aid of a heat exchanger.

24. Process as defined in claim 1, characterized in that the induction system is flushed with the oxidizing agent.

25. Process as defined in claim 24, characterized in that the induction system is flushed by means of a preconnected charge blower and suitable slide or valve arrangements.

26. Internal combustion engine comprising at least one cylinder having a combustion chamber for the combustion of a fuel by means of a gaseous oxidizing agent and also comprising an induction system, characterized in that the induction system has an injector for a charging fuel and an ignition device.

27. Internal combustion engine as defined in claim 26, characterized in that the induction system has several injectors for said charging fuel.

28. Internal combustion engine as defined in claim 26, characterized in that the induction system has several ignition devices.

29. Internal combustion engine as defined in claim 26, characterized in that the induction system has at least one induction pipe designed as a vibration pipe.

30. Internal combustion engine as defined in claim 26, characterized in that the induction system has at least one charging chamber having at least one injector for said charging fuel and at least one ignition device.

31. Internal combustion engine as defined in claim 26, characterized in that the induction system has a resonance pipe.

32. Internal combustion engine as defined in claim 31, characterized in that the resonance pipe has at least one throttle valve for subdividing the resonance pipe.

33. Internal combustion engine as defined in claim 31, characterized in that the induction system has at least one charging chamber having at least one injector for said charging fuel and at least one ignition device.

34. Internal combustion engine as defined in claim 33, characterized in that the volume of said at least one charging chamber is 5 to 10% of the volume of the resonance pipe.

35. Internal combustion engine as defined in claim 26, characterized in that the injector is connected to a receptacle for storing the fuel of the internal combustion engine.

36. Internal combustion engine as defined in claim 26, characterized in that the injector is connected to a receptacle for storing hydrogen.

37. Internal combustion engine as defined in claim 26, characterized in that the internal combustion engine is designed for the combustion of hydrogen.

38. Internal combustion engine as defined in claim 26, characterized in that the internal combustion engine is designed for the combustion of a mixture consisting of hydrogen and an additional reducing agent.

39. Internal combustion engine as defined in claim 26, characterized in that at least one valve is arranged between the induction system and the supply of oxidizing agent.

40. Internal combustion engine as defined in claim 39, characterized in that at least one rotary slide valve is arranged between the induction system and the supply of oxidizing agent.

41. Internal combustion engine as defined in claim 39, characterized in that at least one passive check valve is arranged between the induction system and the supply of oxidizing agent.

42. Internal combustion engine as defined in claim 39, characterized in that at least one active check valve is arranged between the induction system and the supply of oxidizing agent.

43. Internal combustion engine as defined in claim 26, characterized in that the internal combustion engine has a heat exchanger for cooling the induction system.

44. Internal combustion engine as defined in claim 26, characterized in that the internal combustion engine as a charge blower with slide or valve arrangements for flushing the induction system.

* * * * *